United States Patent
Yang

(10) Patent No.: US 11,758,211 B2
(45) Date of Patent: Sep. 12, 2023

(54) TELEVISION SYSTEM, CONTROL METHOD AND NON-TRANSITORY COMPUTER READABLE MEDIUM

(71) Applicant: Realtek Semiconductor Corporation, Hsinchu (TW)

(72) Inventor: Guang Yang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/523,997

(22) Filed: Nov. 11, 2021

(65) Prior Publication Data

US 2022/0159328 A1 May 19, 2022

(30) Foreign Application Priority Data

Nov. 16, 2020 (CN) .......................... 202011277665.9

(51) Int. Cl.
*H04N 21/2665* (2011.01)
*H04N 21/466* (2011.01)
*H04N 21/266* (2011.01)

(52) U.S. Cl.
CPC ... *H04N 21/2665* (2013.01); *H04N 21/26603* (2013.01); *H04N 21/4665* (2013.01)

(58) Field of Classification Search
CPC ......... H04N 21/2665; H04N 21/26603; H04N 21/4665
See application file for complete search history.

(56) References Cited

U.S. PATENT DOCUMENTS

| | | | | |
|---|---|---|---|---|
| 8,230,471 | B2 * | 7/2012 | Cheng | H04N 21/2665 |
| | | | | 725/132 |
| 2009/0249396 | A1 * | 10/2009 | Cheng | H04H 60/43 |
| | | | | 725/39 |
| 2010/0263010 | A1 * | 10/2010 | Kim | H04N 21/4345 |
| | | | | 725/110 |
| 2016/0295286 | A1 * | 10/2016 | Kang | H04N 21/482 |
| 2017/0063563 | A1 * | 3/2017 | Saikun | H04L 43/062 |
| 2017/0251243 | A1 * | 8/2017 | Lee | H04N 21/4622 |

FOREIGN PATENT DOCUMENTS

| | | |
|---|---|---|
| CN | 104053067 A | 9/2014 |
| CN | 108337570 A | 7/2018 |

* cited by examiner

*Primary Examiner* — Mulugeta Mengesha
(74) *Attorney, Agent, or Firm* — Locke Lord LLP; Tim Tingkang Xia, Esq.

(57) ABSTRACT

A television system with a network function is disclosed. The television system includes several client devices and a server device. The several client devices are configured to store and transmit the client information. The client information includes channel information and several positions of the several client devices. The server device is communicatively connected to the several client devices and is configured to receive the client information, to integrate the client information so as to generate integrated information, and to transmit the integrated information to the several client devices. The several client devices are further configured to confirm the several integrated information so as to update the several client information.

15 Claims, 3 Drawing Sheets

| DAMF1 | PA1 |
|---|---|
| DAMF2 | PA2 |
| DAMF3 | PA3 |
| ⋮ | ⋮ |
| DAMFN | PAN |

TELEVISION SYSTEM, CONTROL METHOD AND NON-TRANSITORY COMPUTER READABLE MEDIUM

CROSS-REFERENCE TO RELATED APPLICATION

This application claims the priority benefit of China Application serial no. 202011277665.9, filed Nov. 16, 2020, the full disclosure of which is incorporated herein by reference.

BACKGROUND

Field of Invention

The invention relates to a television system, a control method and a non-transient computer readable medium. More particularly, the invention relates to a television system, a control method and a non-transient computer readable medium with a network communication function.

Description of Related Art

There are two commonly used ATV scanning methods. In the PAL system, the starting frequency is used as the starting point, and by adding one frequency each time, the scanning operation is performed to frequency points one by one from the starting point to the ending point. In the NTSC system, there is usually a frequency point table, and according to the frequency points in the frequency point table, confirmation is performed one by one to collect program information. The commonly used DTV scanning method is similar to the ATV/NTSC system, with a fixed frequency point table, and according to the frequency points in the frequency point table, the digital signals of each frequency points are searched one by one to obtain all of the program information. For the method of signal confirming mentioning above, it is not easy to miss the program information every time the channel is scanned, but the overall scanning time is too long, and if there is a new frequency point, the scanning process needs to be performed again.

In addition, some programs with preset channels set some preset channels according to different regions, so that the users can watch programs even without scanning the channel. However, since the channel is artificially preset in advance, it has been fixed before leaving the factory. If the TV program supplier subsequently changes, or if there is a new frequency point (or the frequency point did not send a digital signal originally), there will be a program omission.

SUMMARY

An aspect of this disclosure is to provide a television system with a network function. The television system includes several client devices and a server device. The several client devices are configured to store and transmit the client information. The several client information include several channel information and several positions of the several client devices. The server device is communicatively connected to the several client devices and is configured to receive the several client information, to integrate the several client information so as to generate several integrated information, and to transmit the several integrated information to the several client devices. The several client devices are further configured to confirm the several integrated information so as to update the several client information.

Another aspect of this disclosure is to provide a control method. The control method is adapted to a television system with a network function, in which the television system includes several client devices and a server device. The control method includes the following operations: transmitting several client information to the server device by the several client devices, in which the several client information include several channel information and several positions of the several client devices; integrating the several client information by the server device to generate several integrated information, and transmit the several integrated information to the several client devices; and confirming the several integrated information by the several client devices and updating the several client information according to the several integrated information.

Another aspect of this disclosure is to provide a non-transient computer readable medium, including at least one program command configured to operate a control method, in which the control method includes following operations: transmitting several client information to a server device by several client devices, in which the several client information include several channel information and several positions of the several client devices; receiving an integrated information generated according to the several client information by the several client devices; and confirming the integrated information and updating the several client information according to the integrated information by the several client devices.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
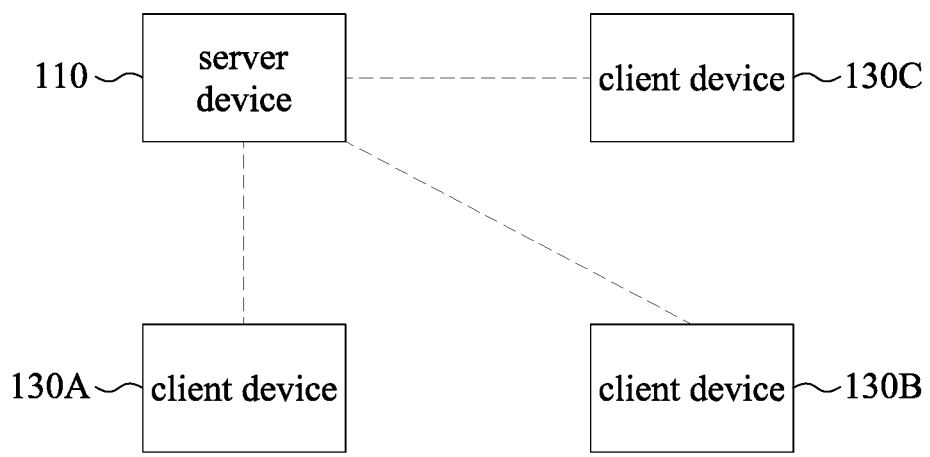
FIG. 1 is a schematic diagram illustrating a television system according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

FIG. 1 is a schematic diagram illustrating a television system 100 according to some embodiments of the present disclosure. The television system 100 includes a server device 110 and several client devices 130A to 130C. The server device 110 is communicatively connected to several client devices 130A to 130C through the network. The television system 100 as illustrate in FIG. 1 is for illustrative purposes only, and the embodiments of the present disclosure are not limited thereto. The detailed operation method of television system 100 will be explained in reference to FIG. 2 below.

Figure 2:
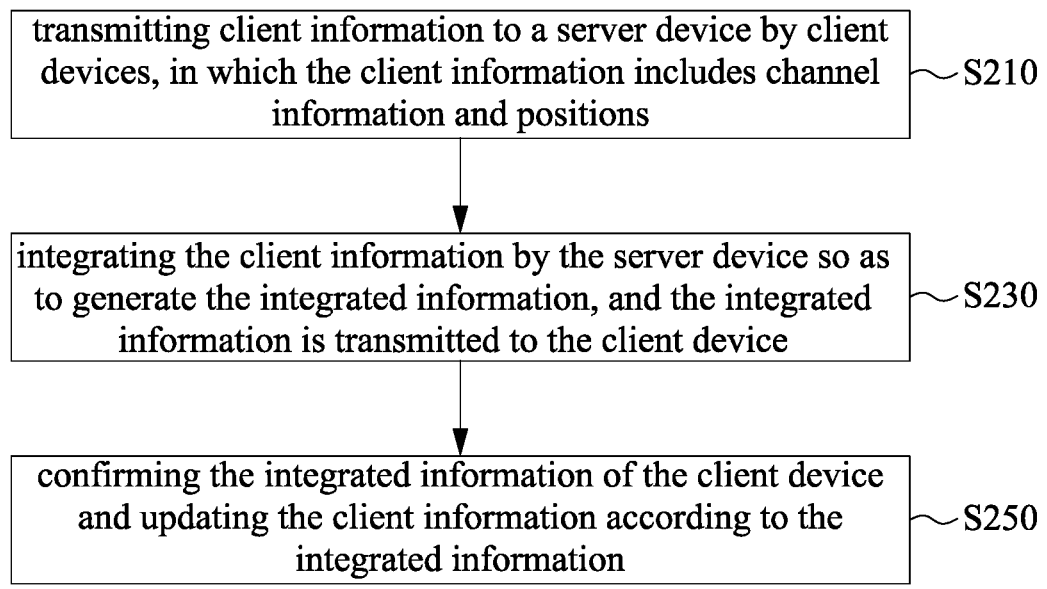
FIG. 2 is a flow chart illustrating a control method according to some embodiments of the present disclosure.

Reference is made to FIG. 2. FIG. 2 is a flow chart illustrating a control method 200 according to some embodiments of the present disclosure. However, the embodiments of the present disclosure are not limited thereto.

It should be noted that, the control method can be applied to a system with the same or similar structure as the television system 100 in FIG. 1. For ease of illustration, the operation method will be described below in reference to FIG. 1 as an example, but the embodiments of the present disclosure are not limited to the application of FIG. 1.

It should be noted that, in some embodiments, the control method 200 may be implemented as a computer program, and is stored in a non-transient computer readable medium. When the computer program is executed by a computer, an electronic device, or the one or more processor (not shown) of the server device 110 and the client devices 130A to 130C of the television system 100 to perform the control method. The processor can consist of one or more chips. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

Furthermore, it should be noted that, the operations of the operation method mentioned in the present embodiment can be adjusted according to actual needs except for those whose sequences are specifically stated, and can even be executed simultaneously or partially simultaneously.

Furthermore, in different embodiments, these operations may also be adaptively added, replaced, and/or omitted.

Reference is made to FIG. 2. The control method 200 includes the following operations.

In operation S210, client information is transmitted to a server device by client devices. The client information includes channel information and positions. Reference is made to FIG. 1, in some embodiments, each of the client devices 130A to 130C are stored with client information, and the client information includes at least one channel information and the position.

Figures 3, 4:
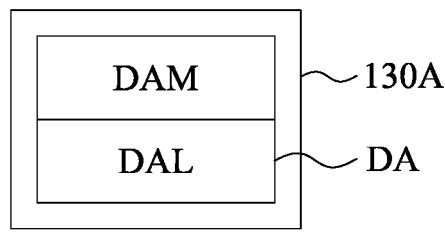
FIG. 3 is a schematic diagram illustrating client information of a client device according to some embodiments of the present disclosure.
FIG. 4 is a schematic diagram illustrating channel information according to some embodiments of the present disclosure.

For example, reference is made to FIG. 3 at the same time. FIG. 3 is a schematic diagram illustrating client information 130DA of the client device 130A according to some embodiments of the present disclosure. As illustrated in FIG. 3, the client device 130A includes the client information DA. The client information 130D includes the channel information DAM and the position DAL of the client device 130A.

Reference is made to FIG. 4 at the same time. FIG. 4 is a schematic diagram illustrating channel information DAM according to some embodiments of the present disclosure. As illustrated in FIG. 4, the channel information DAM includes several frequency points DAMF1 to DAMFN and program information PA1 to PAN. Each of the several frequency points DAMF1 to DAMFN corresponds to one of the program information PA1 to PAN. For example, the frequency point DAMF1 corresponds to the program information PA1, the frequency point DAMF2 corresponds to the program information PA2, and so on.

Each of the client devices 130B and 130C includes its own client information, and will not be described in detail here.

In some embodiments, the frequency points and the corresponding program information stored in the client device 130 are transmitted to the client device 130A by the server device 110 or are obtained by the client device 130A operating scanning operation. In some embodiments, the client device 130A is further configured to mark the sources of the program information PA1 to PAN. For example, assume that the frequency point DAMF1 is transmitted to the client device 130A by the server device 110, the client device 130A marks the frequency point DAMF1 so as to label that the frequency point DAMF1 is obtained from the server device 110. For another example, assume that the frequency point DAMF2 is obtained by the client device 130A operating the scanning operation, the client device 130A marks the frequency point DAMF2 to label that the frequency point DAMF2 is obtained from the scanning operation.

In operation S210, each of the client devices 130A to 130C transmits the stored client information to the server device 110. In some embodiments, the client devices 130A to 130C periodically transmit the client information to the server device 110. The transmission cycle and the transmission time of the client devices 130A to 130C can be the same or different. In some embodiments, the client devices 130A to 130C transmit the client information to the server device 110 after every boot up.

In some embodiments, when the client devices 130A to 130C transmit the stored client information to the server device 110, the client devices 130A to 130C transmit all frequency points DAMF1 to DAMFN and the program information PA1 to PAN or part of the frequency points DAMF1 to DAMFN and the program information PA1 to PAN.

In some embodiments, in operation S210, when one of the client devices 130A to 130C determines that a loss occurs at one of the stored several frequency points and the program information, the one of the client devices 130A to 130C further reports the signal loss event to the server device 110.

For example, when the client device 130A determines that a signal loss occurs at the frequency point DMAF3 and/or the program information PA3, the client device 130A transmits the signal loss information to the server device 110.

In some embodiments, after the client device 130A operates the scanning operation and discovered that there is new frequency point and/or program information other than the stored frequency points and program information, the client device 130A transmits the newly discovered frequency point and/or the program information to the server device 110.

In operation S230, the client information is integrated by the server device so as to generate the integrated information, and the integrated information is transmitted to the client device. Reference is made to FIG. 1 at the same time. In some embodiments, the server device 110 receives the client information transmitted by at least one of the client devices 130A to 130C, the server device 110 integrates the client information to generate the integrated information, and the server device 110 transmits the integrated information to at least one of the client devices 130A to 130C.

For example, after the client device 130A discovers that a signal loss occurs at the frequency point DAMF3, the message of signal loss is transmitted to the server device 110. After the server device 110 integrates the client information of the client devices 130A to 130C, the message that a signal loss occurs at the frequency point DAMF3 is transmitted to the client devices 130B and 130C.

In some embodiments, the server device 110 is further configured to classify the channel information according to the positions of the client device 130A to 130C, to generate the integrated information according to the positions of the client devices 130A to 130C, and to transmit the integrated information according to the positions of the client devices 130A to 130C. Since the program information and the frequency points are different between regions and the program information and the frequency points between the same or adjacent areas are the same, when the server device 110 is integrating information, the server device 110 further considers the positions corresponding to the channel information.

In some embodiments, the server device 110 is further configured to perform classification and arrangement according to different positions, to separate the client devices of the same position together, to extract the relatively complete channel information of this region, and to sort out the frequency points that include programs, in which the frequency points of the ATV and DTV are included.

In some embodiments, the server device 110 is further configured to receive the service provider information. The service provider information may be obtained from the program service provider. In some embodiments, the provider information is the directly edited and stored information of the server device.

In operation S250, the integrated information of the client device is confirmed and the client information is updated according to the integrated information. For example, reference is made to FIG. 1 at the same time. In some embodiments, assume that the positions of the client device 130A and the client device 130B are the same. When the client device 130B receives the integrated information from the server device 110 and notices that a problem of signal loss occurs at the frequency point DAMF3, the client device 130B confirms whether the problem of signal loss at frequency point DAMF3 really occurs or not. For another example, when the client device 130B receives the integrated information from the server device 110 and notices that there is a newly added frequency point, the client device 130B confirms whether the information of at the newly added frequency point can be locked or not.

In some embodiments, the client device 130B then sends the confirmed data or result to the server device 110 for the server device 110 to perform integration.

In some embodiments, when the client devices 130A to 130C receive the integrated information transmitted from the server device 110, the client devices 130A to 130C check the correctness of the integrated information, determines the similarities and differences between the integrated information and the stored information, and transmits the results of inspection or determination to the server device 110. In some embodiments, the client devices 130A to 130C report data to the server device 110 only when the integrated information is wrong or when the integrated information is different from the stored data.

In some embodiments, the client devices 130A to 130C are affected by different positions, different signal strengths, and different tuner hardware, so the signals that can be searched on some client devices may not be locked and broadcasted normally on another client device. The client device needs to confirm the received integrated information. For example, whether the signal of the frequency point exists or not needs to be detected. If it exists, it should be able to receive the program information of the frequency point transmitted from the server device 110 without going through the entire scanning process of the frequency point. Generally, the program information in the same area should be fixed. When the individual influence of each client device is excluded, the same information should be obtained.

In some embodiments, the server device 110 further includes a processor, a memory and an input/output element. Each of the client devices 130A to 130C further includes a processor, a memory and an input/output element. The memory is configured to store the information of the client information and the integrated information. The processer is configured to execute the control method. The input/output element is configured to transmit and receive information. In some embodiments, the processor can be a server, a circuit, a central processing unit (CPU), a microprocessor (MCU) with functions such as storage, calculation, data reading, signals or messages receiving, and signals or messages transmitting, or other devices with equivalent functions.

The numbers of the client devices, the channel information, the frequency points, the program information, etc., as described above are for illustrative purposes only, and the embodiments of the present disclosure are not limited thereto.

According to the embodiment of the present disclosure, it is understood that the embodiment of the present disclosure is to provide a television system, a control method and a non-transient computer readable medium, by transmitting the information between the server device and the client device through the network, the time consumed for the first scan is shortened, and the function of automatically updating programs in the background is included. In the case of decentralized collection and distribution, the time required to sweep the table is minimized and the necessary accuracy is retained to enhance the user experience.

In addition, in the embodiments of the present disclosure, for the ATV system with sequence scan, through the collected information, the number of frequency points that need to be confirmed during the scanning process is reduced. The ATV system with table scan reduces the number of frequency points that need to be confirmed during the scanning process through the collected information, so as to speed up the scanning process. For the DTV system with table scan, through the collected information, the number of frequency points that need to be confirmed during the scanning process is reduced, or by skipping certain scanning procedures after a fixed frequency point, the scanning speed is accelerated. For the preset channels of ATV and DTV, the number and content of the preset channels can be dynamically updated more accurately with the information collected.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed, and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A television system with a network function, comprising:
   a plurality of client devices, configured to store and transmit a plurality of client information, wherein the plurality of client information comprise a plurality of channel information and a plurality of positions of the plurality of client devices; and
   a server device, communicatively connected to the plurality of client devices, configured to receive the plurality of client information, to integrate the plurality of client information so as to generate a plurality of integrated information, and to transmit the plurality of integrated information to the plurality of client devices;
   wherein the plurality of client devices are further configured to confirm the plurality of integrated information so as to update the plurality of client information;
   wherein the plurality of channel information further comprise a plurality of frequency points and a plurality of program information corresponding to the plurality of frequency points;
   wherein the plurality of client devices are further configured to mark a plurality of sources of the plurality of program information, wherein when a first client device of the plurality of client devices obtain a first frequency point of the plurality of frequency points from the server device, the first client device is configured to mark the first frequency point so as to label that the first frequency point is obtained from the server device, and wherein when the first client device obtains a second frequency point of the plurality of frequency points by operating a scanning operation, the first client device is configured to mark the second frequency point so as to label that the second frequency point is obtained from the scanning operation.

2. The television system of claim 1, wherein the server device is further configured to classify the plurality of channel information according to the plurality of positions.

3. The television system of claim 1, wherein when one of the plurality of client devices determines that a signal loss occurs at one of the plurality of program information and the plurality of frequency points, the one of the plurality of client devices is further configured to report to the server device.

4. The television system of claim 1, wherein the plurality of client devices is further configured to periodically transmit the plurality of client information to the server device.

5. The television system of claim 1, wherein the server device is further configured to generate the plurality of integrated information according to a service provider information.

6. The television system of claim 1, wherein the server device is further configured to generate the plurality of integrated information according to the plurality of positions, and to transmit the plurality of integrated information according to the plurality of positions.

7. A control method, adapted to a television system with a network function, wherein the television system comprises a plurality of client devices and a server device, wherein the control method comprises:
   transmitting a plurality of client information to the server device by the plurality of client devices, wherein the plurality of client information comprise a plurality of channel information and a plurality of positions of the plurality of client devices;
   integrating the plurality of client information by the server device to generate a plurality of integrated information, and transmit the plurality of integrated information to the plurality of client devices;
   confirming the plurality of integrated information by the plurality of client devices and updating the plurality of client information according to the plurality of integrated information, wherein the plurality of channel information further comprise a plurality of frequency points and a plurality of program information corresponding to the plurality of frequency points; and
   marking a plurality of sources of the plurality of program information, wherein when a first client device of the plurality of client devices obtain a first frequency point of the plurality of frequency points from the server device, the first client device is configured to mark the first frequency point so as to label that the first frequency point is obtained from the server device, and wherein when the first client device obtains a second frequency point of the plurality of frequency points by operating a scanning operation, the first client device is configured to mark the second frequency point so as to label that the second frequency point is obtained from the scanning operation.

8. The control method of claim 7, further comprising:
   classifying the plurality of channel information by the server device according to the plurality of positions.

9. The control method of claim 7, further comprising:
   reporting to the server device when one of the plurality of client devices determines that a signal loss occurs at one of the plurality of program information.

10. The control method of claim 7, further comprising:
    transmitting periodically the plurality of client information to the server device by the plurality of client devices.

11. The control method of claim 7, further comprising:
    generating the plurality of integrated information according to a service provider information by the server device.

12. The control method of claim 7, further comprising:
generating the plurality of integrated information according to the plurality of positions, and transmitting the plurality of integrated information according to the plurality of positions.

13. A non-transitory computer readable medium, comprising at least one program command configured to operate a control method, wherein the control method comprises following operations:
transmitting a plurality of client information to a server device by a plurality of client devices, wherein the plurality of client information comprise a plurality of channel information and a plurality of positions of the plurality of client devices;
receiving an integrated information generated according to the plurality of client information by the plurality of client devices;
confirming the integrated information and updating the plurality of client information according to the integrated information by the plurality of client devices, wherein the plurality of channel information further comprise a plurality of frequency points and a plurality of program information corresponding to the plurality of frequency points; and
marking a plurality of sources of the plurality of program information, wherein when a first client device of the plurality of client devices obtain a first frequency point of the plurality of frequency points from the server device, the first client device is configured to mark the first frequency point so as to label that the first frequency point is obtained from the server device, and wherein when the first client device obtains a second frequency point of the plurality of frequency points by operating a scanning operation, the first client device is configured to mark the second frequency point so as to label that the second frequency point is obtained from the scanning operation.

14. The non-transitory computer readable medium of claim 13, the control method further comprising:
reporting to the server device when determining that a signal loss occurs at one of the plurality of program information.

15. The non-transitory computer readable medium of claim 13, the control method further comprising:
transmitting periodically the plurality of client information to the server device.

* * * * *